United States Patent [19]

Lewis et al.

[11] Patent Number: 5,712,631
[45] Date of Patent: Jan. 27, 1998

[54] INTRINSICALLY SAFE DATA NETWORK

[75] Inventors: Roger M. Lewis; Steven L. Cook; Kevin D. Fink, all of Duncan, Okla.

[73] Assignee: Halliburton Company, Duncan, Okla.

[21] Appl. No.: 620,769

[22] Filed: Mar. 22, 1996

[51] Int. Cl.$^6$ ........................................ G01V 1/00
[52] U.S. Cl. ............................................ 340/853.1
[58] Field of Search ........................ 340/853.1; 364/420

[56] References Cited

U.S. PATENT DOCUMENTS

| | | | |
|---|---|---|---|
| 4,691,384 | 9/1987 | Jobe | 455/602 |
| 5,583,764 | 12/1996 | Nail et al. | 364/420 |

*Primary Examiner*—Ian J. Lobo
*Attorney, Agent, or Firm*—Stephen R. Christian; E. Harrison Gilbert, III

[57] ABSTRACT

An intrinsically safe data network, such as one defining a system for acquiring and transferring data from inside a hazardous zone at an oil or gas well to outside the hazardous zone, includes a fixed number of at least one data signal conductor and a fixed number of at least one intrinsic safety barrier forming part of the overall network that allows for the use of more transducers than there are intrinsic safety barrier(s).

8 Claims, 2 Drawing Sheets

5,712,631

INTRINSICALLY SAFE DATA NETWORK

BACKGROUND OF THE INVENTION

This invention is an intrinsically safe data network, such as a system for acquiring and transferring data from inside a hazardous zone at an oil or gas well to outside the hazardous zone.

It is well known that oil and gas well locations can have hazardous zones such as due to the presence of flammable liquids and gases. These substances can be electrically ignited.

Although these zones and dangers are known to exist at oil and gas well sites, electrical equipment sometimes must be used in these areas to, for example, sense data such as temperature, pressure and flow rate. When this equipment is used, precautions must be taken to avoid accidents from occurring in these zones. These precautions include using within these zones electrical equipment that meets known standards which qualify the equipment as "intrinsically safe." For example, certified intrinsically safe transducers and intrinsic safety barriers (devices that connect the transducers to equipment outside the hazardous zone) are used to obtain data and permit its communication to a computer located at the well site but outside the hazardous zone.

Prior systems of such transducers and intrinsic safety barriers have provided a safe means for obtaining data from inside a hazardous zone and communicating that data outside the hazardous zone; however, such systems have a shortcoming, namely, each conductor or conductor pair from every transducer must have a respective intrinsic safety barrier for that conductor or conductor pair to be connected outside the hazardous zone. This can be expensive if several transducers need to be used. Furthermore, a supply of intrinsic safety barriers must be kept on hand in the event additional transducers are needed in the hazardous zone. Another shortcoming of this type of system, wherein each transducer directly communicates to a device outside the hazardous zone, is that the external device must have enough inputs to receive the signals from each of the transducers.

In view of these shortcomings there is the specific need for an intrinsically safe data network wherein the number of intrinsic safety barriers needed is limited to a predetermined number without effectively limiting the number of transducers that can be used ("without effectively limiting" being interpreted in view of some maximum number of transducers that would ever actually be used in any particular installation, such as at a typical oil and gas well location).

SUMMARY OF THE INVENTION

The present invention overcomes the above-noted and other shortcomings of the prior art by providing a novel and improved intrinsically safe data network. More specifically, the present invention provides a system for acquiring and transferring data from inside a hazardous zone at an oil or gas well to outside the hazardous zone. This invention includes a fixed, predetermined number of one or more intrinsic safety barriers, but it allows for the use of more transducers than there are intrinsic safety barriers. This provides for reduced cost since an intrinsic safety barrier is not needed for each transducer. This also enhances flexibility and facilitates installation since the number of transducers used in a hazardous zone can be changed without having to install or remove corresponding intrinsic safety barriers.

The intrinsically safe data network for communicating from inside a hazardous zone to outside the hazardous zone comprises a plurality of transducers for use within the hazardous zone. Each transducer has at least one electrical conductor for conducting an analog electrical signal representing a parameter sensed by the respective transducer. The network further comprises transducer communication interface means for connecting to the plurality of transducers within the hazardous zone and for converting the analog electrical signals from the plurality of transducers into respective data signals. The network still further comprises boundary crossing connector means for conducting the data signals from the transducer communication interface means within the hazardous zone to a location outside the hazardous zone. This boundary crossing connector means includes a predetermined plurality of signal conductors, wherein the predetermined plurality is less than the number of electrical conductors of the plurality of transducers. The boundary crossing connector means also includes a predetermined number of at least one intrinsic safety barrier connected to the signal conductors. Preferably the number of one or more intrinsic safety barriers is not greater than the number of signal conductors.

Stated another way, the present invention provides a system for acquiring and transferring data from inside a hazardous zone at an oil or gas well to outside the hazardous zone, comprising: a communication connection network including a fixed number of at least one data signal conductor and a fixed number of at least one intrinsic safety barrier, each intrinsic safety barrier connected within at least a respective data signal conductor so that one end of the respective conductor is disposed within the hazardous zone and the other end of the respective conductor is disposed outside the hazardous zone; a plurality of transducers disposed in the hazardous zone; and means for receiving signals from the transducers, processing received signals into data signals, and communicating the data signals over the fixed number of at least one data signal conductor so that only the fixed number of at least one data signal conductor and the fixed number of at least one intrinsic safety barrier are needed for communicating data signals out of the hazardous zone regardless of the number of the plurality of transducers used at an actual oil or gas well.

Therefore, from the foregoing, it is a general object of the present invention to provide a novel and improved intrinsically safe data network and, more particularly, a system for acquiring and transferring data from inside a hazardous zone at an oil or gas well to outside the hazardous zone. Other and further objects, features and advantages of the present invention will be readily apparent to those skilled in the art when the following description of the preferred embodiments is read in conjunction with the accompanying drawings.

DETAILED DESCRIPTION OF PREFERRED EMBODIMENTS

Figure 1:
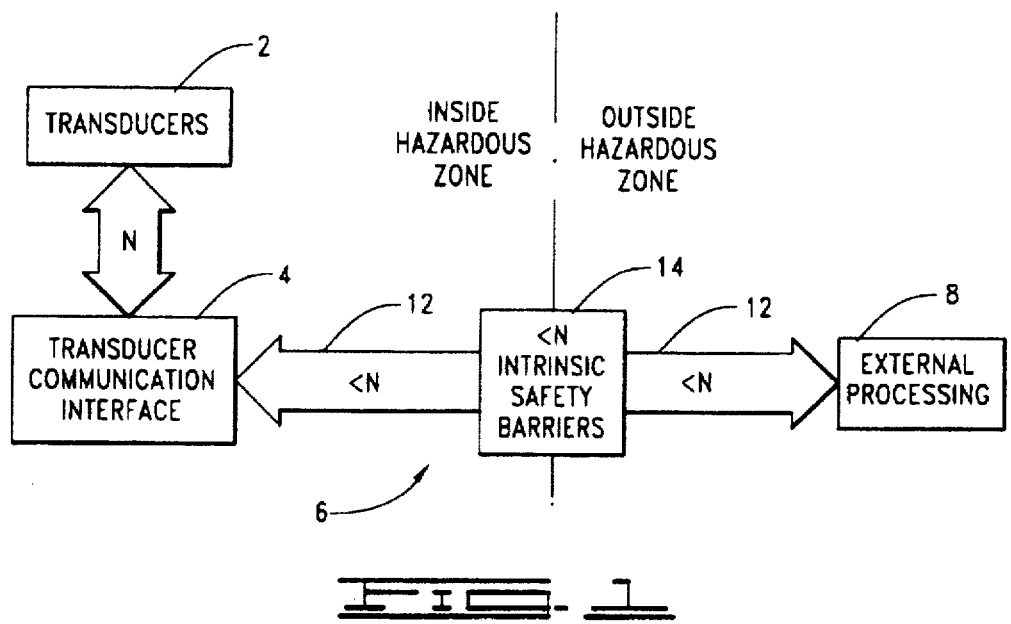
FIG. 1 is a block diagram depicting one embodiment of the present invention.

An intrinsically safe data network in accordance with the present invention is illustrated in FIG. 1. The network includes a plurality of transducers 2, transducer communication interface means 4, boundary crossing connector means 6, and external processing means 8. The transducers 2 and the transducer communication interface means 4, along with part of the boundary crossing connector means 6, are disposed in a hazardous zone, such as in a gaseous environment at an oil or gas well. The other portion of the boundary crossing connector means 6 and the external processing means 8 are located outside the hazardous zone as indicated in FIG. 1.

The transducers 2 are of a type suitable for use within the hazardous zone. Preferably these are certified intrinsically safe, which is a type of transducer known in the art. Transducers in general are devices that convert physical properties, such as heat, pressure, differential pressure, flow rate, etc., into measurable electrical signals. Typically, such quantities as temperature, pressure, etc., are converted to analog electrical voltage or current outputs. Flow rates are typically output as a frequency of an electrical signal. To provide its respective analog electrical signal representing a measurement of the respective physical parameter or property, each transducer has at least one electrical conductor for conducting the signal.

In prior systems, the electrical conductors from the transducers 2 connect to respective intrinsic safety barriers in passing outside the hazardous zone to some type of processing equipment. In the present invention, however, each of the electrical conductors from the transducers 2 is connected to the transducer communication interface means 4. This is represented in FIG. 1 by the "N" number of conductors extending between the transducers 2 and the transducer communication interface means 4. These connections can be implemented by connecting a single transducer to a respective interface forming the means 4, or multiple transducer conductors can be connected to a common or shared interface of the means 4.

The transducer communication interface means 4 can be a circuit simply providing a networking capability whereby signals from the transducers 2 are communicated over a common predetermined number of conductors of the boundary crossing connector means 6. Preferably, however, the transducer communication interface means 4 provides at least the capability of converting the typically analog transducer output signals to a digital format. This can be accomplished by a conventional analog-to-digital converter combined with a networking capability. Even more preferably, the transducer communication interface means 4 can also include a processing capability, such as one which provides correction factors in determining actual measured parameter values. This would, for example, convert a 0–5 volt dc signal representing 0–100 psig pressure into a digital format specifying the actual corrected pressure measurement. Converting the analog transducer output signals to digital signals reduces or eliminates any noise effects that can be present in the hazardous zone where the present invention is to be used.

Thus, from the foregoing, the transducer communication interface means 4 connects to the plurality of transducers 2 within the hazardous zone and preferably converts the analog electrical signals into respective data signals. More specifically, the preferred means 4 receives signals from the transducers, processes the received signals into data signals, and communicates the data signals over the boundary crossing connector means 6. Because the boundary crossing connector means 6 has a fixed number of data signal conductors as explained below, the transducer communication interface means 4 enables the data signals it provides to be communicated over this fixed number of data signal conductors. Only this fixed number of data signal conductors, and a fixed number of intrinsic safety barriers forming another part of the boundary crossing connector means 6 as further explained below, are needed for communicating data signals out of the hazardous zone regardless of the number of transducers used at an actual hazardous zone such as one at an actual oil or gas well. It will be apparent that the foregoing can be implemented by what could be referred to as "smart" transducers, namely transducers with some type of processing and/or networking capability. This can be individual transducers having their own "intelligence" components or multiple transducers connected to a common "intelligent" device as referred to above.

Figure 2:
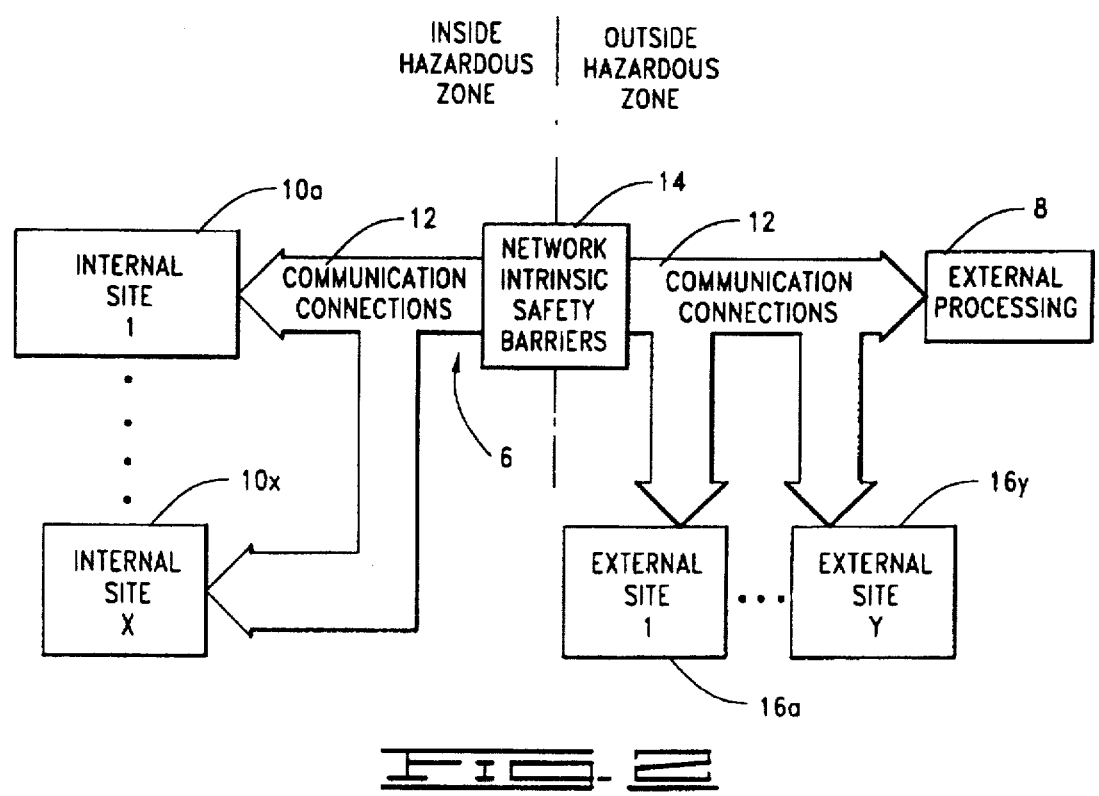
FIG. 2 is a block diagram of another embodiment of the present invention.

A system having multiple individual "smart" transducers or the like or having multiple common configurations is illustrated in FIG. 2. Each "internal site" 10 identified in FIG. 2 represents either an individual transducer with its respective intelligent circuit or a site where multiple transducers communicate with a common interface. These multiple internal sites 10 within the hazardous zone are each connected to a communication connection network defining a particular embodiment of the boundary crossing connector means 6.

The boundary crossing connector means 6 conducts the data signals from the transducer communication interface means 4 within the hazardous zone to a location outside the hazardous zone. The boundary crossing connector means 6 includes one or more, and preferably a predetermined plurality of signal conductors 12. The boundary crossing connector means 6 also includes a predetermined number of one or more intrinsic safety barriers 14 preferably of a number not greater than the number of signal conductors 12. Each intrinsic safety barrier 14 is connected to at least one of the signal conductors 12 of the boundary crossing connector means 6. The numbers of conductors 12 and intrinsic safety barriers 14 are less than the number "N" of electrical conductors of the plurality of transducers 2 so that not as many intrinsic safety barriers 14 are needed as would be needed if the transducers connected directly across the boundary of the hazardous zone.

The signal conductors 12 can be any suitable type, but in the preferred embodiment they are electrical signal conductors such as ones made of metal wire. As shown in FIGS. 1 and 2, one end of the conductors 12 is located in the hazardous zone, being connected to the transducer interface means 4 of one or more internal sites 10; and the other end of the conductors 12 is connected outside the hazardous zone, such as to the external processing means 8.

Connected intermediate the two ends of each conductor is an intrinsic safety barrier 14. This is a known type of device, one example of which is the MTL700 series (specifically, for example, Model MTL765) from MTL Instruments Group PLC.

When multiple sites 10 are connected to the conductors 12, the boundary crossing connector means 6 defines the communication connection network such as illustrated in FIG. 2 where the multiple internal sites 10a–10x are connected to the conductors 12. FIG. 2 also shows that external sites 16a–16y can be connected to the conductors 12 between the intrinsic safety barrier(s) 14 and the external processing means 8. All of these internal and external sites can be connected without adding additional conductors 12 or additional intrinsic safety barriers 14 because the numbers of conductors 12 and intrinsic safety barriers 14 are fixed regardless of the number of transducers 2 used.

FIGS. 1 and 2 illustrate that the conductors 12 connect to an external processing means 8. This is equipped with networking capabilities which only need to connect to the predetermined number of conductors 12 without needing to have individual inputs to receive the voltage, current or frequency outputs provided by the respective transducers 2.

The external processing means 8 can be implemented by any suitable device or devices. One type is a programmable logic controller. Another example is a programmed computer. In the preferred embodiment, these are programmed to organize the information derived from the digital data signals representing the measured physical parameters into a coherent report. The specific nature of the external processing means 8 is not material to the present invention. The significance instead is merely that the external processing means 8 connects to the conductors 12 (and thus to the intrinsic safety barrier(s) 14) outside the hazardous zone, and the external processing means 8 receives the data signals conducted over the signal conductors 12 through the intrinsic safety barriers 14 for further processing not inventively material to the present invention.

Figure 3:
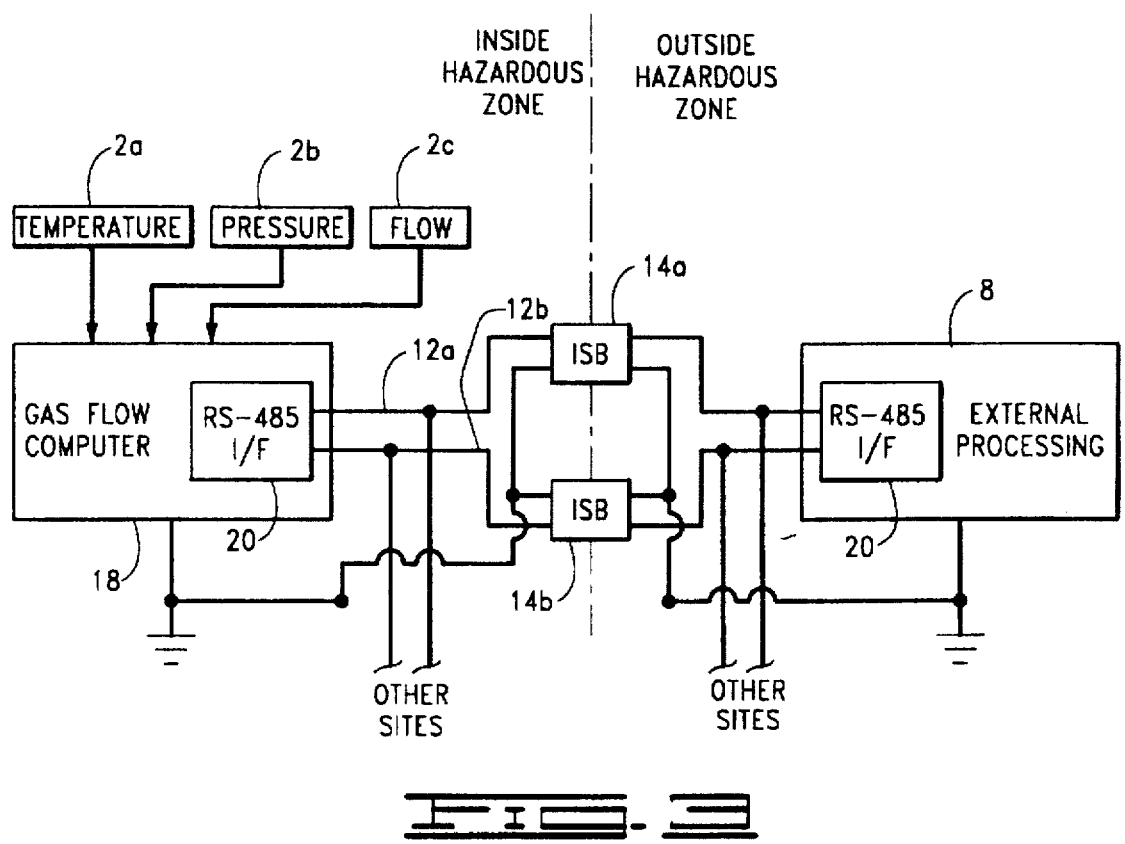
FIG. 3 is a block diagram representing a particular implementation of the present invention.

Referring to FIG. 3, a specific implementation of the present invention will be described. This is specifically a system for acquiring and transferring data from inside a hazardous zone at an oil or gas well to outside the hazardous zone.

Located within the hazardous zone of the FIG. 3 implementation are a temperature transducer 2a, a pressure transducer 2b and a flow transducer 2c, each certified intrinsically safe. Each of these provides a respective analog electrical signal output to a gas flow computer 18 implementing the transducer communication interface means 4. The details of the gas flow computer 18 are not important to the present invention as it can be implemented in any suitable manner; however, it preferably is able to read the analog signals from the transducers 2a, 2b, 2c and convert them into corrected digital values defining the measured conditions. A specific example of such a gas flow computer is one from Halliburton Energy Services in Duncan, Okla. Forming part of the gas flow computer 18 is an RS-485 interface 20 which is any suitable circuit conforming to the RS-485 standard known in the art (a specific circuit is one provided by Halliburton Energy Services). The RS-485 standard provides for two communication lines identified in FIG. 3 as conductors 12a, 12b. Thus, the data conductors 12a, 12b are of fewer number than the transducers 2a, 2b, 2c and their output electrical conductors. Furthermore, only two conductors 12a, 12b are needed regardless of the number of additional transducers that can be added (up to a total number of thirty-two sites 10, 16 can be connected to the two conductors 12a, 12b as defined by the RS-485 standard, and there can be multiple transducers at each site).

The conductor 12a connects to another RS-485 interface 20 in the external processing means 8 through a respective intrinsic safety barrier 14a, and the conductor 12b connects to the interface 20 of the external processing means 8 through a respective intrinsic safety barrier 14b. Although separate intrinsic safety barriers 14a, 14b are shown in FIG. 3, a single barrier unit such as the model MTL765 ac unit can be used since it provides barrier protection for two wires; therefore, there can be fewer intrinsic safety barriers 14 than conductors 12.

The two data signal conductors 12a, 12b define a network bus. The "other sites" indicated in FIG. 3 connect in electrical parallel to this bus. One way to do this is to use a four-conductor shielded RS-485 cable connected to each site. The shields are commonly grounded (with the power system ground). One pair of the four wires of one such cable defines conductors 12a, 12b. One wire of the other pair of this cable connects at one end to the conductor 12a and connects at its other end to one wire of the cable for another site; the other wire of the other pair of wires of the cable at the first site connects at one end to the conductor 12b and connects at its other end to a second wire of the cable for the other site. The other two wires at the other site connect in this same manner between the second and third site, and so on. At the last site, the second pair of wires of the respective cable connects to a line termination circuit for the pertinent communication standard. For RS-485, this can be a series resistor-capacitor circuit (120 ohm–0.001 microfarad) connected between the two wires of the second pair. The same type termination circuit is also connected at the end of the conductors 12a, 12b connected to the intrinsic safety barrier (s) 14.

Although the FIG. 3 implementation uses the RS-485 standard and a network bus configuration in accordance with that standard, other types of standards and network configurations can be used. For example, a ring structure or a double bus structure can be used. Examples of other data network standards are IEEE 802.3, IEEE 802.5 and IEEE 802.6.

The RS-485 standard allows up to thirty-two transducer communication interface means 4 to be connected to the single RS-485 bus. As explained, a single RS-485 bus consists of two wires for signal, and a possible third conductor (e.g., the cable shield) to assure electrical grounds are at the same potential. Maximum combined cable length is approximately 4,000 feet, with a maximum transmission speed of 10 megabytes per second. The inclusion of additional sites to this network is simple as the respective transducer communication interface means 4 of each additional site merely taps into the two or three wire bus as illustrated in FIG. 3 and explained above. Specifically for the FIG. 3 implementation, additional interfaces 20 would be connected in electrical parallel to the conductors 12a, 12b.

Although not illustrated in the drawings, another conductor that may be used and that intersects the hazardous zone boundary is one or more power conductors to provide external power to the internal sites within the hazardous zone. This can be accomplished in a conventional manner known in the art and is outside the scope of the present invention which is directed to the data transmission network.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A system for acquiring and transferring data from inside a hazardous zone at an oil or gas well to outside the hazardous zone, comprising:

a communication connection network including a fixed number of at least one data signal conductor and a fixed number of at least one intrinsic safety barrier, each said intrinsic safety barrier connected within at least a respective data signal conductor so that one end of the respective conductor is disposed within a hazardous zone at an oil or gas well and the other end of the respective conductor is disposed outside the hazardous zone, wherein said communication connection network includes two data signal conductors;

a plurality of transducers disposed in the hazardous zone; and means for receiving signals from said transducers, processing received signals into data signals, and communicating said data signals over said fixed number of at least one data signal conductor so that only said fixed number of at least one data signal conductor and said fixed number of at least one intrinsic safety barrier are needed for communicating data signals out of the hazardous zone regardless of the number of said plurality of transducers used at an actual oil or gas well, wherein said means for receiving, processing and communicating includes a plurality of RS-485 interface means connected in electrical parallel to said two data signal conductors for effecting communications over said two data signal conductors in RS-485 format.

2. A system as defined in claim 1, wherein:

said means for receiving, processing and communicating includes a gas flow computer having said RS-485 interface means therein; and said plurality of transducers includes a temperature transducer, a pressure transducer and a flow transducer connected to said gas flow computer within the hazardous zone.

3. A system as defined in claim 2, further comprising external processing means for connecting to said communication connection network outside the hazardous zone and for receiving the data signals conducted over said data signal conductors through said at least one intrinsic safety barrier.

4. A system as defined in claim 3, wherein there is a single intrinsic safety barrier unit connected to both of said two data signal conductors.

5. An intrinsically safe data network for communicating from inside a hazardous zone to outside the hazardous zone, comprising:

a plurality of transducers for use within the hazardous zone, each transducer having at least one electrical conductor for conducting an electrical signal representing a parameter sensed by the respective transducer;

boundary crossing connector means for conducting data signals from within the hazardous zone to a location outside the hazardous zone, said boundary crossing connector means including:

a fixed predetermined plurality of signal conductors, wherein said fixed predetermined plurality is less than the number of said electrical conductors of said plurality of transducers; and a fixed predetermined number of at least one intrinsic safety barrier connected to said signal conductors; and a plurality of transducer communication interface means for use at a plurality of internal sites within the hazardous zone, each said interface means connected to a respective group of at least one of said plurality of transducers inside the hazardous zone and each said interface means connected in electrical parallel to the same said fixed predetermined plurality of signal conductors inside the hazardous zone, for communicating onto said signal conductors data signals responsive to the electrical signals of said plurality of transducers.

6. A network as defined in claim 5, further comprising external processing means for connecting to said boundary crossing connector means outside the hazardous zone and for receiving the data signals conducted over said signal conductors through said at least one intrinsic safety barrier.

7. A network as defined in claim 6, wherein there are two said signal conductors and there is a single intrinsic safety barrier connected to both of said two signal conductors.

8. A network as defined in claim 7, wherein:

at least one of said transducer communication interface means includes a gas flow computer; and said plurality of transducers includes a temperature transducer, a pressure transducer and a flow transducer connected to said gas flow computer within the hazardous zone.

* * * * *